United States Patent [19]

Nishii et al.

[11] Patent Number: 5,557,760

[45] Date of Patent: Sep. 17, 1996

[54] INTEGRATED CIRCUIT DATA PROCESSOR INCLUDING A CONTROL PIN FOR DEACTIVATING THE DRIVING OF A DATA BUS WITHOUT DEACTIVATING THAT OF AN ADDRESS BUS

[75] Inventors: Osamu Nishii, Kokubunji; Takashi Inagawa, Owari-Asahi; Makoto Hanawa, Niiza; Hiroshi Takeda, Higashi-Yamato, all of Japan

[73] Assignee: Hitachi, Ltd., Tokyo, Japan

[21] Appl. No.: 117,681

[22] Filed: Sep. 8, 1993

[30] Foreign Application Priority Data

Sep. 11, 1992 [JP] Japan ................................ 4-242949

[51] Int. Cl.$^6$ ................................................ G06F 13/20
[52] U.S. Cl. .................... 395/310; 395/445; 364/238.6; 364/240; 364/242.92; 364/234.41; 364/DIG. 1
[58] Field of Search ...................... 364 MS/200 MS File, 364 MS/900 MS File; 395/400, 425, 445, 490, 403, 309, 310, 311, 493, 287, 288

[56] References Cited

U.S. PATENT DOCUMENTS

| | | | |
|---|---|---|---|
| 4,539,652 | 9/1985 | Rubin ................................ | 395/328 |
| 4,837,461 | 6/1989 | Kubosawa et al. .................... | 307/303 |
| 5,088,023 | 2/1992 | Nakamura et al. .................... | 395/430 |
| 5,349,666 | 9/1994 | Adachi et al. ........................ | 395/750 |
| 5,375,209 | 12/1994 | Maher et al. ........................ | 395/500 |

OTHER PUBLICATIONS

INTEL Corp. manual, "i486 TM Microprocessor", 1989, pp. 1–125.

*Primary Examiner*—Eddie P. Chan
*Assistant Examiner*—Hiep T. Nguyen
*Attorney, Agent, or Firm*—Fay, Sharpe, Beall, Fagan, Minnich & McKee

[57] ABSTRACT

A processor for use in a data processing system with a cache RAM and main memory has a control pin for deactivating the driving of the data bus without deactivating that of the address bus during a write cycle. This capability is useful during a cache storing operation following a miss for performing a write operation without the requirement of additional address storing circuitry. In particular, during a cache storing operation, the processor can drive the address bus while control of the data bus by the processor is floated. Then, the data in main memory can be put on the data bus and transferred into the cache memory. Once the data is transferred to the cache memory, the original write operation can be completed.

9 Claims, 3 Drawing Sheets

INTEGRATED CIRCUIT DATA PROCESSOR INCLUDING A CONTROL PIN FOR DEACTIVATING THE DRIVING OF A DATA BUS WITHOUT DEACTIVATING THAT OF AN ADDRESS BUS

FIELD OF THE INVENTION

The present invention relates to an integrated circuit data processor, such as a microprocessor, and a data processing system using the processor.

The specifications of the external terminals and bus cycles of an existing microprocessor are described on pp. 100–125 of the i486 microprocessor manual of Intel Corp. ("i486 TM Microprocessor" Intel Corp , 1989) The manual describes that 30 address pins, 32 data pins, and other control pins are used as external pins (external terminals) of the chip. It is possible to transfer data to the outside by driving (or activating) the external data pins through output buffers. It is also possible to suppress the transfer of the data to the outside by not driving external data pins through the output buffers (this is also referred to as "deactivating").

The present invention relates to the driving of the address and data pins. Table 1 shows an analysis of whether or not the Intel 486 drives the address and data pins in data write and data read cycles (as used, the expression "in data write and data read cycles" represents only the bus cycle period).

TABLE 1

|  |  | Address | Data |
|---|---|---|---|
| In data write | Case 1 | O | O |
|  | Case 2 | X | O |
|  | Case 3 | X | X |
| In data read | Case 4 | O | X |
|  | Case 5 | X | X |

O: Processor LSI drives bus.
X: Processor LSI does not drive bus.

In a data write cycle, the bus operation comes to any one of the cases 1 to 3 listed in Table 1. For the case 1, the processor drives the address and data buses. This is a general write operation for writing data. Case 2 is described in Section 7.2.8 "INVALIDATE CYCLES" on pp. 116–117 of the Intel manual. In this section, it is described that driving of the address bus by the processor is stopped by setting the AHOLD pin to H (high potential). This invalidates the internal cache of the processor. Case 3 is described in Section 7.2.9 "BUS HOLD" on pp. 119–120 of the above manual. In Section 7.2.9, it is described that the processor floats the address and data pins when the HOLD pin is set active (potential H). This allows another bus master to control the bus for as long as the HOLD pin is held active.

In data read, the bus operation comes to any one of the cases 4 and 5. Data is fetched to the processor from the outside for the data read operation. Therefore, the processor does not drive the data pins. The case 4 is a general operation for reading data, in which the processor drives the address pins. In case 5, as described in Section 7.2.8 of the above manual, driving of the address pins of the processor is stopped by activating or setting the AHOLD pin to the potential H. At the same time, data is fetched to the processor from the outside in the read cycle and the processor does not drive the data pins. As described in Section 7.2.9 of the above manual, driving of the address and data pins of the processor is floated by setting the HOLD pin to the potential H.

SUMMARY OF THE INVENTION

When a data processing system uses an existing processor, a problem occurs that will be explained with reference to FIG. 3 which shows a schematic view of a data processing system that includes a processor 301, such as an Intel 486 microprocessor, cache RAM 302, and main memory 303. An address bus 304 and data bus 305 of the system are directly connected to the address and data pins of the processor 301, respectively. If there is a cache RAM miss during a write operation, an operation for storing the data requested by the processor 301 in the cache RAM 302 from the main memory 303 (the operation is hereafter referred to as cache storing operation) should be performed.

If the cache storing operation is performed during the write bus cycle period of the processor by using a write address provided by the processor, the data bus 305 cannot be used for data transfer from the main memory 303 to the cache RAM 302 because the processor drives the data bus 305 under the normal operation for data write (the case 1 in Table 1). Even for the operation of the case 2 in which driving of the address pins is stopped for invalidation of the internal cache of the processor 301, the same problem occurs with the data bus and it cannot be used for data transfer from the main memory 303 to the cache RAM 302 because the processor drives the data bus. For the operation of the case 3, the processor 301 does not drive the data bus 305. In this case, however, a problem occurs that no address is supplied to the cache RAM 302 or main memory 303 because the processor 301 does not drive the address bus 304.

To solve these problems, it is necessary to prepare an external circuit, such as a cache controller having an address register for storing the address requested by the processor 301 and supplying the address to the cache RAM 302 and main memory 303. To solve the problem in this way, however, it is necessary to add extra hardware. Therefore, there is a disadvantage that the system hardware cost increases.

The object of cache storing can be achieved without a separate circuit during the operation represented by case 1 by preparing a transfer path for transferring data from the main memory 303 to the cache RAM 302 independently of the data bus 305. In this case, however, there are disadvantages that means for selecting between a plurality of data buses are additionally necessary and thereby the system hardware cost increases, which is likewise a disadvantage.

Therefore, an object of the present invention is to provide a processor capable of enabling a data transfer operation between devices connected to a data bus using addresses generated by the processor during a write bus cycle in a system having a configuration as shown in FIG. 3.

Another object of the present invention is to provide a hardware system for accomplishing the aforementioned object that does not increase the costs and have the disadvantages associated with using a separate external address holding and supplying circuit, or with an extra data bus that requires means for selecting between a plurality of data buses.

To achieve the above objects, the processor (such as an LSI, VLSI, etc. chip or microprocessor, hereinafter referred to merely as a processor) of the present invention has, among others, terminals connected with an address bus, terminals connected with a data bus, and a terminal for receiving a signal that deactivates the data bus without deactivating the address bus. This signal is hereinafter referred to as a data-only deactivating signal.

In a typical embodiment of the present invention, the processor is used in a data processing system having a cache memory and main memory connected to an address bus and data bus, respectively, for access by the processor. When the write bus cycle of the processor fails in caching, the processor floats its data pins so that the data bus is not being driven by the processor even during the write bus cycle period of the processor. This is accomplished by setting the data-only deactivating signal to the logical value 1. With the data-only deactivating signal set, it is possible to transfer data from the main memory to the cache memory over the data bus at the period. Then, the data bus is driven by the processor and the write data requested by the processor appears on the data bus to complete the original write operation.

DETAILED DESCRIPTION OF THE PREFERRED EMBODIMENTS

Figure 1:
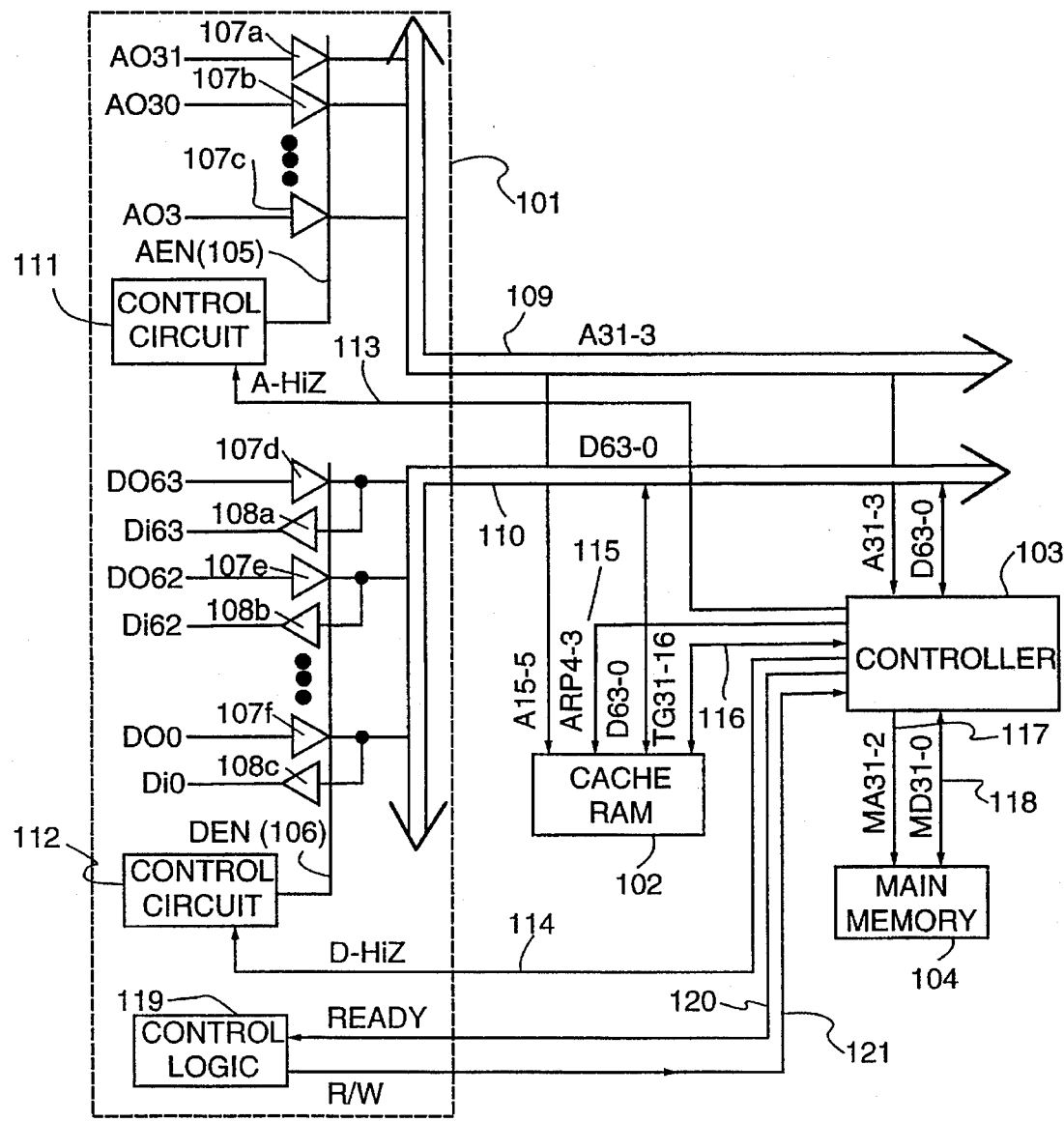
FIG. 1 shows a block diagram of the data processing system of an embodiment of the present invention.

FIG. 1 shows the processor of the present invention used in a data processing system of a preferred embodiment of the present invention. The processor 101 has address terminals and data terminals which are connected with a 29-bit address bus 109 and a 64-bit data bus 110, respectively. A cache RAM 102 serving as a cache memory, and an external circuit controller 103 and main memory 104 are connected to the address and data buses. The buses 109 and 110 are directly used as an address bus and data bus on a printed circuit board, for example.

As shown in FIG. 1, output buffers 107a, 107b, and 107c have a high-impedance function and output an address A31-3 to the address bus 109 when a control signal AEN (105) of a control circuit 111 is set to the logical value 1. Similarly, output buffers 107d, 107e, and 107f, having a high-impedance function, output data DO63-DO0 from the processor 101 to the data bus 110 when a control signal DEN (106) of a control circuit 112 is set to the logical value 1. Input buffers 108a, 108b, and 108c are used to input external data Di63-Di0 to the processor 101. Further, in the preferred embodiment of the processor 101, input signals A-HiZ and D-HiZ generated by controller 103 are input to terminals or pins 113 and 114 of the processor 101 to control the generation of signals AEN (105) and DEN (106), respectively.

The signal A-HiZ (113) is inputted to the control circuit 111 for generating the signal AEN (105). The control circuit 111 has a function for detecting "A-HiZ=1" setting the signal AEN (105) to the logical value 0, with the result that the driving of the address bus 109 is suppressed, i.e. the driving of the address bus by the processor is floated. Similarly, the signal D-HiZ (114) is inputted to the control circuit 112 for generating the signal DEN (106). The control circuit 112 has a function for detecting "D-HiZ=1" setting the signal DEN (106) to the logical value 0, with the result that the driving of the data bus 110 is suppressed, i.e. the driving of the data bus by the processor is floated.

A READY signal (120) is a control signal transferred from the controller 103 to the processor 101, which notifies the processor of a completion of a bus cycle. It is predetermined that when "READY=logical value 1" the completion of a bus cycle during the bus cycle period is notified to the processor. With the READY signal (120), the controller 103 can extend a bus cycle without any time limit by setting "READY=0".

An R/W signal (121) is a control signal transferred from the processor 101 to the controller 103 for checking whether the current bus cycle of the processor 101 is a read or write cycle. It is predetermined that when "R/W=logical value 1", a write cycle is being performed. The signals READY (120) and R/W (121) are connected to a control circuit 119 in the processor 101.

Each block of the cache RAM 102 is 32 bytes. The cache RAM 102 is preferably operated by the copy-back scheme, although it could be operated by a write through method. Address signals of a processor address bus A15-5 and an in-block address ARP4-3 (115) are inputted to the address pins of the cache RAM 102 as addresses. The data pins of the cache RAM 102 are connected to a processor data bus D63-0. An in-block address ARP4-3 (115) is outputted from the controller 103. Tag data in the cache RAM 102 is connected to the controller 103 through a tag data bus TG31-16 (116). The main memory 104 is connected with the controller 103 by an exclusive address bus MA31-2 (117) and exclusive data bus MD31-0 (118).

Table 2 shows the bus operation of the processor 101 of an embodiment of the present invention.

TABLE 2

|  |  | A-HiZ | D-HiZ | Address | Data |
|---|---|---|---|---|---|
| In data write | Case 11 | 0 | 0 | O | O |
|  | Case 12 | 1 | 0 | X | O |
|  | Case 13 | 0 | 1 | O | X |
|  | Case 14 | 1 | 1 | X | X |
| In data read | Case 15 | 0 | — | O | X |
| (R/W = 0) | Case 16 | 1 | — | X | X |

—: Don't care
O: Processor drives bus.
X: Processor does not drive bus.

As shown in Table 2, the data write operations represented by cases 11 to 14 are realized by combining A-HiZ (113) with D-HiZ (114). For the cases 15 and 16 in data read, the operational combination is the same as the example of Table 1. Therefore, a detailed description thereof is omitted.

Figure 2:
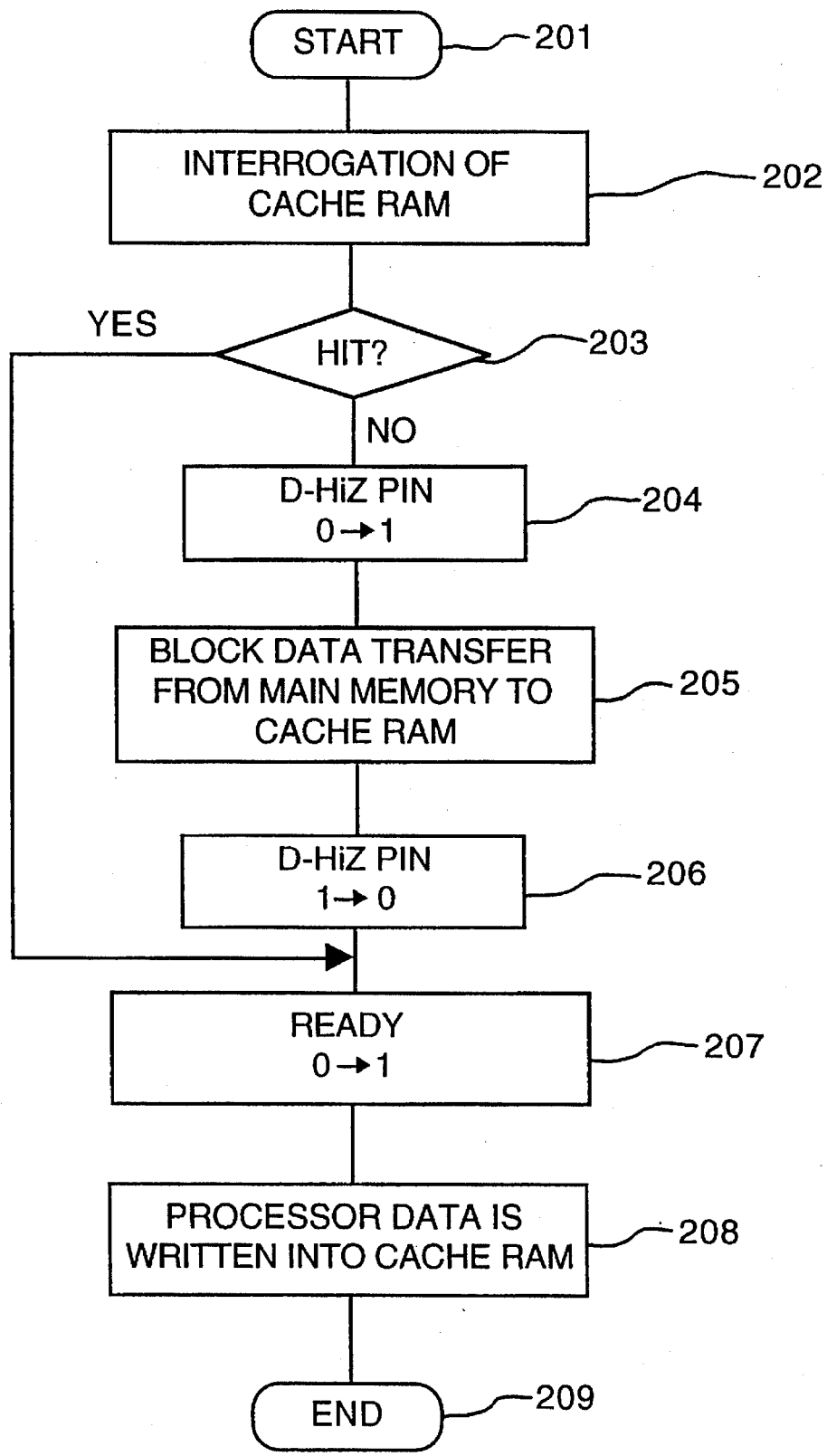
FIG. 2 shows a flow chart of the control performed by an external circuit controller 103 during a write cycle of the processor according to an embodiment of the present invention.
Figure 3:
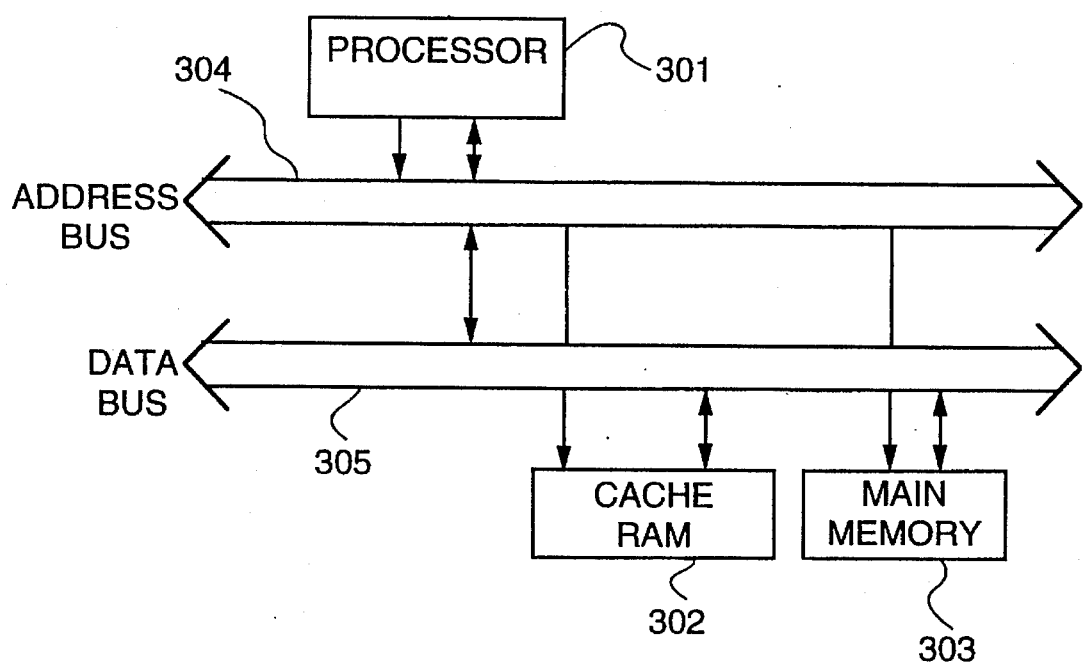
FIG. 3 shows a schematic diagram of a data processing system in which a cache RAM is directly connected to the address/data bus of a processor.

FIG. 2 shows a control flow performed by the controller 103 when the write cycle of the processor 101 occurs. It is possible to judge from "R/W (121)=1" that the bus cycle is the write cycle. In this flow chart, A-HiZ (113) is normally set to the logical value 0.

Step 201 is the start point of the flow chart, which corresponds to the write cycle occurrence time. Under the initial state of step 201, the controller 103 sets the A-HiZ pin (113) and the D-HiZ pin (114) of the processor to the logical value 0 and the READY pin (120) to the logical value 0.

Addresses and data for a write operation are outputted to the address bus 109 and data bus 110 from the processor 101 in the write bus cycle. In the step 202, the interrogation of the cache RAM 102 is performed according to the interrogation address A15-5 among the addresses supplied from the processor 101. Specifically, the address of tag data TG31-16 read from the cache RAM 102 according to the interrogation address of A15-5 is compared with the tag address A31-16 among the addresses supplied from the processor 101 by the controller 103. As known, matching of the both addresses results in a hit and mismatching of them results in a miss.

A branch in the processing occurs depending on a hit or miss in the step 203. A hit represents that the comparison results in a match in step 202. For a hit, the flow proceeds to step 207. For a miss, the flow proceeds to a step 204. In step 204, the controller 103 changes the logical value of the D-HiZ pin (114) of the processor from 0 to 1 in response to the judgment result of a miss. This floats the data output pins of the processor and prevents the driving of the data bus by the processor. In the step 205, data for one block is transferred to the cache RAM 102 from the main memory 104 via the controller 103 and data bus 110.

Before the above data transfer, the copy-back operation may occur depending on the state in the cache RAM 102. Data of a particular address is updated only by the cache RAM 102. When the data of the particular address is not updated in the main memory 104, data for one block including update data of the particular address is transferred to the main memory 104 from the cache RAM 102 via the controller 103.

Both of the above transfer procedures require four times of data transfer in counting on the data bus. According to a conventional address count-up operation, the controller 103 successively outputs counted-up addresses to the in-block address ARP4-3 (115). Moreover, the addresses A15-5 among the addresses of the processor is used as the write address for the cache RAM.

In the step 206, the controller 103 changes the logical value of the D-HiZ pin of the processor from 1 to 0. In the step 207, the processor 101 outputs data to the data bus 110. The data is written in the cache RAM 102.

In the step 208, the controller 103 changes the logical value of the READY pin (120) of the processor from 0 to 1. This processing notifies the processor 101 that the bus cycle is completed and the processor completes the bus cycle. This represents the completion of the write cycle of the processor that had been extended between the steps 201 and 203 for cache hit and between the steps 201 and 206 for cache miss. The step 209 is the end point of the flow chart, which corresponds to the completion time of the write cycle.

Because the sequence control for address and data buses (latch control, delay control synchronizing with clock, or address incrementing) is unnecessary for operation inside the cache RAM 102, the block 102 can be constituted only by general DRAM and SRAM thereby saving additional hardware costs.

The present invention makes it possible to use addresses generated by a processor and, at the same time, transfer data between devices connected to the data bus of the processor during the write bus cycle period of the processor. The operation results from the fact that the driving of the data bus by the processor can be floated even during the write bus cycle period of the processor by setting the data-only deactivating signal to the logical value 1. Moreover, only a very small quantity of hardware is necessary to execute the above operation. Specifically, it is unnecessary to use an additional circuit for holding and supplying to the processor addresses for a cache storing operation or alternatively to use a new data bus between main memory and the cache. Therefore, it is possible to decrease the hardware system cost and offer data processing systems with a good cost/performance ratio to users.

We claim:

1. A data processing system including:

an integrated circuit data processor;

a cache memory, coupled with said integrated circuit data processor via a system address bus and a system data bus, being accessed by said integrated circuit data processor;

a controller coupled with said integrated circuit data processor via said system address bus and said system data bus;

a main memory, coupled with said controller via a main memory address bus and a main memory data bus, being accessed by said integrated circuit data processor;

wherein said integrated circuit data processor comprises:

address terminals for outputting addresses to an external device;

data terminals for outputting data to an external device;

a plurality of first output circuits each having a high-impedance state and each outputting an address signal to a corresponding one of said address terminals;

a plurality of second output circuits each having a high-impedance state and each outputting a data signal to a corresponding one of said data terminals;

a first external control terminal for receiving a first external control signal from an external device;

a second external control terminal for receiving a second external control signal from an external device;

a first control circuit connected to said first output circuits and to said first external control terminal for switching a signal outputting state of each of said plurality of first output circuits into the high-impedance state in response to said first external control signal being received at said first external control terminal; and a second control circuit connected to said second output circuits and to said second external control terminal for switching a signal outputting state of each of said plurality of second output circuits into the high-impedance state in response to said second external control signal being received at said second external control terminal, wherein said controller generates said second external control signal at a predetermined level designating deactivation of said plurality of said second output circuits for switching the signal outputting state of said plurality of said second output circuits to said high-impedance state, when a miss that occurs to said cache memory during a write access from said integrated circuit data processor is detected by said control circuit.

2. An integrated circuit data processor, comprising:

address terminals for outputting addresses to an external device;

data terminals for outputting data to an external device;

a plurality of first output buffers for outputting an address signal on corresponding ones of said address terminals;

a plurality of second output buffers for outputting a data signal on corresponding ones of said data terminals;

a first external control terminal for receiving a first external control signal from an external device;

a second external control terminal for receiving a second external control signal from an external device;

a first control circuit connected to said first output buffers and to said first external control terminal for disabling each of said plurality of first output buffers in response to said first external control signal received at said first external control terminal; and a second control circuit connected to said second output buffers and to said second external control terminal for disabling each of said plurality of second output buffers in response to said second external control signal received at said second external control terminal, wherein said first control circuit and said second control circuit function separately from one another whereby in a write cycle of the processor, said second control circuit disables said second output buffers while said first control circuit does not disable the first output buffers.

3. An integrated circuit data processor having external address terminals and external data terminals for connection to address and data buses, respectively;

said external address terminals having a first plurality of at least two state buffers for controlling output of an address on an address bus, one of said states being a high impedance state for floating the external address terminals;

said external data terminals having a second plurality of at least two state buffers for controlling output of data on a data bus, one of said states being a high impedance state for floating the external data terminals;

means connected to said first and second plurality of output buffers for controlling the states of the first and second plurality of output buffers independently to switch the external data terminals from a signal outputting state to the high impedance state without switching the external address terminals to the high impedance state in response to receiving a data only deactivating signal supplied from outside of the integrated circuit data processor during a write cycle of said integrated circuit data processor.

4. An integrated circuit data processor according to claim 3, wherein said controlling means includes at least one external control pin for receiving a data only deactivating signal supplied from outside of the integrated circuit data processor.

5. An integrated circuit data processor according to claim 4, wherein said controlling means includes at least one external control pin and at least one data enabling internal control circuit connected to said external control pin for generating a signal that switches the second plurality of output buffers to the high impedance state when the data only deactivating signal is received.

6. An integrated circuit data processor according to claim 3, wherein said controlling means includes a first external control pin for receiving the data only deactivating signal supplied from outside of the integrated circuit data processor and a second external control pin for receiving an address disabling signal for independently switching the external address terminals to the high impedance state and separate internal control circuits connected to said external control pins for generating signals that independently switch the first and second plurality of output buffers to the high impedance state in accordance with the receiving of the data only deactivating and address disabling signals, respectively.

7. A data processing system including:

an integrated circuit data processor;

a cache memory, coupled with said integrated circuit data processor via a system address bus and a system data bus, for access by said integrated circuit data processor;

a controller coupled with said integrated circuit data processor via said system address bus and said system data bus;

a main memory, coupled with said controller via a main memory address bus and a main memory data bus, being accessed by said integrated circuit data processor;

wherein said integrated circuit data processor has external address terminals and external data terminals for connection to the system address and data buses, respectively;

said external address terminals having a first plurality of at least two state buffers for controlling output of an address on an address bus, one of said states being a high impedance state for floating the external address terminals;

said external data terminals having a second plurality of at least two state buffers for controlling output of data on the data bus, one of said states being a high impedance state for floating the external data terminals;

means connected to the first and second plurality of buffers for controlling the states of the first and second plurality of buffers independently for switching the external data terminals from a signal outputting state to the high impedance state without switching the external address terminals to the high impedance state in response to receiving a data only deactivating signal supplied from outside the processor when said controller generates said data only deactivating signal following a miss occurring to the cache during a write cycle.

8. A data processing system according to claim 7, wherein said controller generates said data only deactivating signal and said controlling means includes at least one external control pin connected to said controller and at least one data enabling internal control circuit connected to said external control pin for generating a signal that switches the second plurality of buffers to the high impedance state when the data only deactivating signal is received.

9. A data processing system according to claim 7, wherein said controller generates said data only deactivating signal and said controlling means includes a first external control pin for receiving the data only deactivating signal supplied from said controller, and a second external control pin for receiving an address disabling signal supplied from said controller for independently switching the external address terminals from a signal outputting state to the high impedance state and separate internal control circuits connected to said external control pins for generating signals that independently switch the first and second plurality of buffers to the high impedance state in accordance with the receiving of the data only deactivating and address disabling signals, respectively.

* * * * *